United States Patent [19]

Yasui et al.

[11] Patent Number: 5,413,629
[45] Date of Patent: May 9, 1995

[54] LASER MARKING AND PRINTING INK THEREFOR

[75] Inventors: Toshihiko Yasui, Yokohama; Yoshio Takimoto, deceased, late of Tokyo, by Kazumi Takimoto, Takeshi Takimoto, executors; Katsuhiko Kawakami, Shisuimachi; Toshiyuki Kiyonari, Hasuda; Norio Endo, Tokyo, all of Japan

[73] Assignees: Dainippon Ink and Chemicals, Inc.; Kirin/Beer Kabushiki Kaisha, both of Tokyo, Japan

[21] Appl. No.: 158,845

[22] Filed: Nov. 29, 1993

[30] Foreign Application Priority Data

Nov. 30, 1992 [JP] Japan .................................. 4-320086

[51] Int. Cl.⁶ .................................................. C09D 11/00
[52] U.S. Cl. ............................... 106/21 R; 106/21 A; 427/296; 427/145
[58] Field of Search .................... 106/21 R, 21 A; 427/596, 145

[56] References Cited

U.S. PATENT DOCUMENTS

| | | | |
|---|---|---|---|
| 4,602,263 | 7/1986 | Borror et al. | 427/555 |
| 4,844,769 | 7/1989 | Kronseder | 156/378 |
| 4,857,502 | 8/1989 | Ueda et al. | 427/150 |
| 5,057,154 | 10/1991 | Kasakata et al. | 106/21 R |

FOREIGN PATENT DOCUMENTS

| | | |
|---|---|---|
| 0133182 | 8/1983 | European Pat. Off. . |
| 0097220 | 1/1984 | European Pat. Off. . |
| 0289041 | 11/1988 | European Pat. Off. . |
| 0439369 | 7/1991 | European Pat. Off. . |
| 53-52442 | 5/1978 | Japan . |
| 55-11857 | 1/1980 | Japan . |
| 57-120493 | 7/1982 | Japan . |
| 59-148695 | 8/1984 | Japan . |
| 1-15397 | 3/1989 | Japan . |

*Primary Examiner*—Helene Klemanski
*Attorney, Agent, or Firm*—Armstrong, Westerman, Hattori, McLeland & Naughton

[57] ABSTRACT

A non-destructive laser marking method including irradiating laser light on a thermosensitive color-forming layer formed by printing with a printing ink containing a leuco dye as a color former and an acidic substance as a color developer, and at least one background color formation inhibitor selected from the group consisting of a water-soluble amino acid, an ammonium salt of an inorganic acid, a pH buffer, and water. Laser marking can be achieved with low energy and at high speed while minimizing background color formation to provide a high-contrast color image.

23 Claims, No Drawings

LASER MARKING AND PRINTING INK THEREFOR

FIELD OF THE INVENTION

This invention relates to high-speed and efficient marking on various display materials, such as labels, attached to outgoing products from a factory on the line of production, packaging, and the like. More particularly, it relates to a method of marking by laser light irradiation on a thermosensitive color-forming layer printed in an arbitrary pattern and to a printing ink therefor.

BACKGROUND OF THE INVENTION

Marking of information on a label, etc. is generally effected by direct printing. The printing is usually carried out by pad printing or screen printing. Pad printing has an advantage in printing on a curved surface because of the elasticity of the pad but is disadvantageous in making a fine pattern with precision. Screen printing also meets difficulty in obtaining a fine pattern with precision due to the limited mesh size of the screen. Besides the poor precision, since printing involves making of a plate for every desired pattern or requires time for setting printing conditions, these methods are by no means suitable for uses demanding real time processing.

Hence, marking by printing has recently been replaced by ink jet marking. Although ink jet marking satisfies the demand for speediness and real time processing which are not possessed by a conventional printing system, the ink to be used, which is jetted from fine nozzles under high pressure, is strictly specified. Unless the specification is strictly met, the ink sometimes causes obstruction of nozzles, resulting in an increase of reject rate. This is the very problem waiting for solution as regards the ink jet system.

In order to overcome the problem, laser marking has lately been attracting attention as a high-speed and efficient marking method and already put to practical use for some uses. Most of the currently developed laser marking techniques comprise irradiating only a necessary area of a substrate with laser light to denature or remove the irradiated area or irradiating a coated substrate with laser light to remove the irradiated coating layer thereby making a contrast between the irradiated area (marked area) and the non-irradiated area (background).

However, in the method of removing a printing ink by laser light irradiation, a contrast between the paper substrate and the printing ink is required, and clear marking cannot be achieved with a lightly colored label. Further, removal of a printing ink, which is nothing less than destruction of the material, causes roughening of the boundary between irradiated and non-irradiated areas, resulting in a failure of obtaining precise marking. It has therefore been suggested to utilize non-destructive color development by laser light irradiation on a label comprising a paper substrate, etc., i.e., thermosensitive color formation. We can find in literature various examples of application of the thermosensitive color formation system (see, e.g., JP-A-53-52442, JP-A-55-11857 and JP-A-59-148695, the term "JP-A" as used herein means an "unexamined published Japanese patent application"), but no cases has been reported in which the system is put to practical use.

On the other hand, in using a one-pack printing ink containing a leuco dye as a color former and an acidic substance as a color developer, if the color former and the color developer are previously mixed and allowed to stand in a hydrophilic medium for a long time, the printing ink tends to undergo self-color formation to cause background coloration, which results in a reduction in contrast between a marked area and a non-marked area (background).

In the light of the above-described circumstances, the present inventors previously studied laser light-induced non-destructive color development and developed a printing ink, e.g., a gravure ink, containing a color former, such as a leuco dye, and a color developer therefor. A marking material comprising a substrate having printed thereon a color-forming layer comprising this ink develops a color image on being irradiated with laser light to easily achieve marking on the substrate made of even paper without being accompanied by destruction of the material (see JP-A-5-58031 and JP-A-5-57463).

It turned out, however, that the above-mentioned printing ink sometimes suffers from color formation during ink preparation (dark color formation) or after printing (background color formation) (the dark color formation will hereinafter be included in background color formation) due to the fact that both the leuco dye as a color former and an acidic substance as a color developer exist in the same system. There has still been a need of further improvement for practical use.

SUMMARY OF THE INVENTION

An object of the present invention is to provide a non-destructive method for marking information on a thermosensitive marking material, e.g., a label, comprising a paper substrate at high speed, with high sensitivity and high efficiency to provide a high marking density, i.e., a high contrast between a marked area and a background.

Another object of the present invention is to provide a printing ink which can be used in the above-mentioned marking method.

A further object of the present invention is to provide a one-pack printing ink for laser marking which is prevented from background color formation.

The inventors have conducted further study for the purpose of suppressing background color formation and, as a result, found specific substances effective as background color formation inhibitors which are different from known substances, such as the compound proposed for use in thermosensitive recording materials (JP-A-57-120493) or sensitizers having fog (background color formation) inhibiting activity (JP-B-1-15397, the term "JP-B" as used herein means an "examined Japanese patent publication"). It has been ascertained that these substances when added to the color former/color developer system considerably prevent background color formation and thereby improve laser marking.

The present invention provides a laser marking method comprising irradiating laser light on a thermosensitive color forming ink layer formed on a substrate, the ink layer being formed by printing with a printing ink comprising a leuco dye as a color former and an acidic substance as a color developer, in which the printing ink further comprises at least one background color formation inhibitor selected from the group consisting of a water-soluble amino acid, an ammonium salt of an inorganic acid, a pH buffer, and water.

The present invention also provides a thermosensitive color forming ink for laser marking which comprises a leuco dye as a color former, an acidic substance as a color developer, and at least one background color formation inhibitor selected from the group consisting of a water-soluble amino acid, an ammonium salt of an inorganic acid, a pH buffer, and water.

The background color formation inhibitors according to the present invention seem to prevent a color former and/or a color developer from dissolving or contacting with each other to cause color formation in the system before laser irradiation. The effect of the background color formation inhibitors appears to be delicately related to a color former, a color developer, and a medium to be combined with. The objects of the present invention are accomplished by selecting an appropriate combination of a background color formation inhibitor, a color former, a color developer, a medium, etc.

DETAILED DESCRIPTION OF THE INVENTION

Color formers which can be used in the present invention include all the color forming substances serving as an electron donor in conventional thermosensitive recording materials. Typical examples of the color formers are colorless leuco dyes capable of forming color by an acidic substance as a color developer, such as triphenylmethanephthalide compounds, azaphthalide compounds, isoindolide phthalide compounds, vinylphthalide compounds, spiropyran compounds, rhodamine lactam compounds, chromenoindol compounds, fluorene compounds, and fluoran compounds, with fluoran compounds being preferred.

Specific examples of leuco dyes are 3,3-bis(p-dimethylaminophenyl)phthalide, 3,3-bis(p-dimethylaminophenyl)-6-dimethylaminophtalide (Crystal Violet Lactone), 3,3-bis(p-dimethylaminophenyl)-6-aminophthalide, 3,3-bis(p-dimethylaminophenyl)-6-nitrophthalide, 3,3-bis(p-dimethylaminophenyl)phthalide, 3,3-bis(3-dimethylamino-7-methyl)fluoran, 3-diethylamino-7-chlorofluoran, 3-diethylamino-6-chloro-7-methylfluran, 3-diethylamino-7-anilinofluoran, 3-diethylamino-6-methyl-7-anilinofluoran, 2-(2-fluorophenylamino)-6-diethylaminofluoran, 2-(2-fluorophenylamino)-6-di-n-butylaminofluoran, 3-piperidino-6-methyl-7-anilinofluoran, 3-(N-ethyl-p-toluidino)-7-(N-methylanilino)fluoran, 3-(N-ethyl-p-toluidino)-6-methyl-7-anilinofluoran, 3-N-ethyl-N-isoamylamino-6-methyl-7-anilinofluoran, 3-N-methyl-N-cyclohexylamino-6-methyl-7-anilinofluoran, 3-N,N-diethylamino-7-o-chloroanilinofluoran, Rhodamine B Lactam, 3-methylspirodinaphthopyran, 3-ethylspirodinaphthopyran, and 3-benzylspironaphthopyran.

Color developers which can be used in the present invention include all the acidic substances serving as an electron acceptor in conventional thermosensitive recording materials, such as inorganic substances (e.g., active clay and acid clay), inorganic acids, aromatic carboxylic acids or anhydrides or metallic salts thereof, organic sulfonic acids, other organic acids, and phenolic compounds, with phenolic compounds being preferred. The terminology "phenolic compounds" as used herein is intended to include those in a salt form except where noted as far as the salt retains a phenolic hydroxyl group.

Of these color developers, some examples of the organic color developers include phenolic compounds, such as phenol, 4-phenylphenol, 4-hydroxyacetophenone, 2,2'-dihydroxydiphenyl, 2,2'-methylenebis(4-chlorophenol), 2,2'-methylenebis(4-methyl-6-t-butylphenol), 4,4'-isopropylidenediphenol (bisphenol A), 4,4'-isopropylidenebis(2-chlorophenol), 4,4'-isopropylidenebis(2methylphenol), 4,4'-ethylenebis(2-methylphenol), 4,4'-thiobis(6-t-butyl-3-methylphenol), 1,1-bis(4-hydroxyphenyl)cyclohexane, 2,2'-bis(4-hydroxyphenyl)-n-heptane, 4,4'-cyclohexylidenebis(2-isopropylphenol), 4,4'-sulfonyldiphenol; salts of these phenolic compounds; salicylic acid anilide; phenol novolak resins; and benzyl p-hydroxybenzoate.

Additionally, polyfunctional phenolic compounds having two or more phenolic hydroxyl groups and having a phenolic hydroxyl equivalent of not more than 400, and preferably not more than 200, such as pyrogallol, resorcin, catechol, and an alkyl gallate, are also preferred. Included among the polyfunctional phenolic compounds are tri- or higher functional phenolic compounds in which part of the phenolic hydroxyl groups forms a salt with a basic substance while satisfying the above-specified hydroxyl equivalent condition.

Of the polyfunctional phenolic compounds preferred are alkyl gallates for their excellence in color developability, clearness and weather resistance of the laser irradiated part and non-color developability of the non-irradiated part.

There is no particular limitation as to the alkyl chains of alkyl gallates and the alkyl chains may be straight chains or branched. Further, they may have a substituent. There is also no particular limitation as to their carbon numbers.

The substances serving as a background color formation inhibitor according to the present invention include various ionizing substances which ionize in a printing ink, such as various water-soluble amino acids, inorganic acid ammonium salts, water, and neutral, acidic or alkaline pH buffers. These substances may be used either individually or in combination of two or more thereof.

The ionizing substances dissolve on being mixed with a printing ink and dissociate into a substantial amount of ions, which seems to have some action either directly or indirectly on the ink system to manifest an inhibitory action on background color formation. The ionizing substance as referred to as a background color formation inhibitor in the present invention means a substance exhibiting a substantial inhibitory effect on background color formation. That is, the ionizing substance is added to the ink system independently of other ionizing substances which may be present in the ink system, such as a color developer or a laser marking sensitizer hereinafter described. The ionizing substance to be added may be a single compound or a mixture of compounds or an aqueous solution thereof. In some cases, water produces a background color formation inhibitory effect by itself and, in this sense and for the sake of convenience, is included in ionizing substances. Preferred ionizing substances include water-soluble amino acids, inorganic acid ammonium salts, and pH buffers.

The water-soluble amino acids may be neutral, acidic or basic. Illustrative examples include glycine, alanine, sarcosine, cystine, aspartic acid, lysine, serine, threonine, α-methylserine, tyrosine, and hydroxyproline. These water-soluble amino acids are added as a nearly saturated aqueous solution. Where the ink system to which the amino acid is to be added already contains water, the amino acid may be added as a solid.

The inorganic acid ammonium salts include ammonium salts of inorganic acids such as hydrochloric acid, nitric acid, sulfuric acid, and carbonic acid.

The pH buffers include both acidic buffers at pH of lower than 7 and alkaline buffers at pH of higher than 7.

While every known acidic buffer is employable, illustrative examples include a potassium chloride-hydrochloric acid system, a potassium hydrogenphthalate-hydrochloric acid system, a potassium hydrogenphthalate-sodium hydroxide system, a potassium dihydrogen phosphate-sodium hydroxide system (Clark-Lubs' buffer solution), a glycine-sodium chloride-hydrochloric acid system, a sodium citrate-hydrochloric acid system, a potassium dihydrogen phosphate-disodium hydrogen phosphate system (Sørensen's buffer solution), a potassium hydrogen citrate-citric acid system, a potassium citrate-hydrochloric acid system, a succinic acid-borax system, a potassium hydrogen citrate-borax system, a potassium dihydrogen phosphate-borax system (Kolthoft's buffer solution), a tartaric acid-sodium tartrate system, a lactic acid-sodium lactate system, an acetic acid-sodium acetate system, a potassium dihydrogen phosphate-disodium hydrogen phosphate system, a sodium diethylbarbiturate-hydrochloric acid system (Michaelis' buffer solution), and a 2,4,6-trimethylpyridine-hydrochloric acid system (Gomori's buffer solution).

While every known alkaline buffer is employable, illustrative examples include a potassium dihydrogen phosphate-sodium hydroxide system, a boric acid-potassium chloride-sodium hydroxide system (Clark-Lubs' buffer solution), a glycine-sodium chloride-sodium hydroxide system, a borax-hydrochloric acid system, a borax-sodium hydroxide system (Sørensen's buffer solution), a potassium dihydrogen phosphate-borax system, a borax-sodium carbonate system, a potassium dihydrogen phosphate-sodium hydroxide system (Kolthoft's buffer solution), an ammonium chloride-aqueous ammonia system, a sodium dimethylglycine-hydrochloric acid system, a sodium diethylbarbiturate-hydrochloric acid system (Michaelis' buffer solution), a boric acid-potassium chloride-sodium carbonate system (Atkins-Pautin's buffer solution), a sodium carbonate-sodium hydrogencarbonate system (Menzel's buffer solution), and a 2-aminomethyl-1,3-propanediol-hydrochloric acid system (Gomori's buffer solution).

Color developability of the thermosensitive printing ink according to the present invention can further be improved to assure increased sensitivity by incorporating a laser marking sensitizer.

Laser marking sensitizers include any of those conventionally known to be useful in laser marking compositions. Among them, boric acid salts, phosphoric acid salts, and silicic acid salts are preferred. The laser marking sensitizer is insoluble per se in a printing ink system and is therefore present in a disperse phase to a dispersed particle size usually of not greater than 10 μm, and preferably from 0.1 to 4 μm. In order to increase dispersibility, the laser marking sensitizer may previously be surface-treated with a titanium coupling agent, a silane coupling agent, a metallic soap, a surface active agent, a resin, etc.

Examples of the boric acid salts include metal salts of boric acid, such as zinc borate, calcium borate, magnesium borate, lithium borate, aluminum borate, sodium borate, manganese borate, and barium borate. These borates may contain bound water or may be an anhydride.

Examples of the phosphoric acid salts include metal salts of phosphoric acid, such as zinc phosphate, calcium primary phosphate, calcium secondary phosphate, calcium tertiary phosphate, magnesium primary phosphate, magnesium secondary phosphate, magnesium tertiary phosphate, lithium primary phosphate, lithium secondary phosphate, lithium tertiary phosphate, aluminum phosphate, sodium primary phosphate, sodium secondary phosphate, sodium tertiary phosphate, potassium primary phosphate, potassium secondary phosphate, potassium tertiary phosphate, manganese phosphate, ammonium manganese phosphate, zirconyl phosphate, barium phosphate, and apatite hydroxide. These phosphates may contain bound water or may be an anhydride.

Examples of silicic acid salts include metal salts of silicic acid and aluminum silicates, such as cordierite, mica (inclusive of natural mica groups, e.g., muscovite, phlogopite, biotite, and sericite, and artificial mica, e.g., fluorine-substituted phlogopite and fluorine-substituted tetrasilicon mica), and zeolite (A type and X type). These silicates may contain bound water or may be an anhydride.

Physical properties of the thermosensitive printing ink according to the present invention can be improved to assure enhanced practical utility of laser marking by incorporating a neutral resin soluble in a lower alcohol or a mixture of a lower alcohol and water and capable of film formation as a binder resin and a lower alcohol or a mixture of a lower alcohol and water as a solvent.

Examples of suitable binder resins are polyamide resins, polybutyral resins, polyvinyl butyral resins, nitrocellulose resins, acrylic resins, vinyl chloride-vinyl acetate copolymer resins, urethane resins, petroleum resins, chlorinated rubber resins, cyclized rubber resins, and alkyd resins, with polyamide resins being preferred.

The alcohol which can be used as a solvent includes lower to medium alcohols having from 1 to 12 carbon atoms. For application to uses demanding strict inhibition of background color formation, lower alcohols having up to 4 carbon atoms are preferred. Water which can also be used as a solvent is preferably pure water or ion-exchanged water.

Water which may be added to the ink system afterward if necessary (post-addition) does not need to be pure water, and may be tap water or well water as long as it has a pH between 5 and 8 and contains no insoluble non-uniform particles. Post-addition of water is effective in the case of non-aqueous ink systems using no water as a solvent.

The color former and the color developer are usually used at a weight ratio of from 0.1/1 to 5/1, and preferably from 0.5/1 to 3/1. The total proportion of the color former and the color developer in a printing ink can be decided so that the non-volatile content of the ink may fall within a range of from 3 to 60% by weight, and preferably from 5 to 45% by weight.

The lower alcohol solvent or a mixed solvent of a lower alcohol and water is used in an amount of from 10 to 90% by weight, and preferably from 20 to 70% by weight, based on the printing ink.

The binder resin may be used in the form of a solution dissolved in a solvent or in the form of a solid. The amount is preferably from 2 to 70% by weight, and more preferably from 4 to 60% by weight, based on the printing ink as a solid basis.

While the buffer functions to afford a specific pH range according to the proportions of the above-mentioned various components, the pH range of the buffer to be added as a background color formation inhibitor is not particularly limited. The buffer is used in an amount of from 2 to 30% by weight, and preferably from 5 to 20% by weight, based on the printing ink.

The amount of the water-soluble amino acid to be added as an aqueous solution ranges from 2 to 30% by weight, and preferably from 5 to 20% by weight, based on the printing ink, though varying depending on the water solubility of the amino acid. Where the amino acid is added as a solid, the amount is from 0.1 to 20% by weight, and preferably from 0.5 to 15% by weight.

The amount of the inorganic acid ammonium salt to be added ranges from 0.1 to 20% by weight, and preferably from 0.5 to 10% by weight, based on the printing ink.

While the amount of water to be post-added if desired is not particularly limited as far as precipitation of a resin, etc. present in the system does not occur, it is usually in the range of from 2 to 35% by weight, and preferably from 4 to 30% by weight, based on the printing ink. Where the system already contains water as a solvent, a supplemental amount of water is added thereto. In the case of a non-aqueous ink system, water is separately added thereto.

Thus, the printing ink according to the present invention comprises the above-mentioned color former, color developer, background color formation inhibitor and, if desired, a laser marking sensitizer, a binder resin, and a solvent.

The manner of compounding of these components is not particularly restricted as far as the color former is prevented from undergoing a color formation reaction. For example, the components may be mixed either simultaneously or separately, or may be added afterward to a printing ink previously prepared.

While not limiting, preferred of printing inks included in the scope of the present invention is a gravure printing ink, especially a lower alcohol-based or lower alcohol/water-based gravure ink comprising a leuco dye as a color former, a phenolic compound as a color developer, a background color formation inhibitor, a specific laser marking sensitizer and, if desired, water. This type of an ink possesses the following advantages: (1) the system undergoes no blank color development and can be used as a one-pack disperse system; (2) a color-forming layer of arbitrary pattern can be formed with ease; (3) a color-forming layer free from background color formation can be formed with a uniform thickness; (4) a color-forming layer highly sensitive to laser light can be obtained so that even where an overcoat layer is provided on the color-forming layer or, besides this, even where the thickness of the color-forming layer is reduced, laser marking can be achieved by irradiation through the overcoat layer without causing destruction of the overcoat layer and the color-forming layer; and (5) an overcoat of various types, such as an OP varnish containing such a solvent that would cause background color formation in a conventional thermosensitive recording material, e.g., ethyl acetate, may be provided directly on the color-forming layer without requiring a protective layer by, for example, gravure coating to provide a thermosensitive recording material free from background color formation. Note that advantage (5) does not mean to exclude formation of a protective layer directly on the color-forming layer.

Suitable combinations of the components constituting the above-mentioned lower alcohol-based or lower alcohol/water-based gravure printing ink will be described below.

Leuco dyes are preferably fluoran compounds. Phenolic compounds to be combined with the leuco dyes are preferably polyfunctional phenolic compounds having two or more phenolic hydroxyl groups and having a phenolic hydroxyl equivalent of not more than 400, and preferably not more than 200, such as pyrogallol, resorcin, catechol, and alkyl gallates. Also included in the polyfunctional phenolic compounds are tri- or higher functional phenolic compounds in which part of the phenolic hydroxyl groups forms a salt with a basic substance while satisfying the above-specified hydroxyl equivalent condition. Among the polyfunctional phenolic compounds, alkyl gallates are particularly preferred for their excellence in color developability, clearness and weather resistance of the laser irradiated part and non-color developability of the non-irradiated part.

Laser marking sensitizers preferably include zinc borate, aluminum borate, zinc phosphate, zirconyl phosphate, cordierite, and mica, with zinc borate being more preferred because of its excellence in water resistance, resistance to plasticizers, and laser color developability.

As a background color formation inhibitor, any of pH buffers, water-soluble amino acids, and ammonium chloride is effective. From the standpoint of cost and ease of preparation, ammonium chloride is relatively preferred.

The thus prepared printing ink is printed on a substrate under conditions causing no color formation reaction of the color former. The printing method is not particularly limited. The amount of the printing ink to be applied may be less than that of a conventional thermosensitive recording material, i.e., a dry thickness of from 5 to 10 g/m$^2$. That is, a dry thickness of at least 1.0 g/m$^2$, and preferably of from 1.5 to 4 g/m$^2$, would be enough in the present invention. When a printing ink is printed on only the parts where laser marking is intended to provide any desired pattern, such a reduced thickness of the printed area is advantageous in that the difference in level between the printed part and the non-printed part can be minimized. It follows that precision in cutting a pile of printed substrates to prepare a plurality of labels at a time is greatly improved and that a pile of the resulting labels can be handled with a labeler much more easily.

Any printable substrate can be used in the present invention. For example, paper, plastic or metallic molded bodies, plates or films, plastic-coated or metal-deposited paper, and metal-deposited plastic films can be used.

Lasers which can be used in the present invention preferably include pulsing lasers capable of giving energy of at least 0.1 J/cm$^2$•pulse, and preferably at least 0.2 J/cm$^2$•pulse, to the irradiated surface and scanning lasers having an output of at least 0.5 W. Specific examples of these lasers are a carbonic acid gas laser, a carbon monoxide laser, a semi-conductor laser, a yttrium-aluminum-garnet (YAG) laser, and an excimer Laser. Above all, a transversely excited atmospheric pressure (TEA) type carbonic acid gas laser and a scanning type carbonic acid gas laser are preferred for achieving marking with satisfactory visual appreciation for black color.

In using a pulsing laser whose energy per shot is limited, the laser marking method of the present invention in which marking can be performed with low energy is extremely suitable.

That is, the printing ink of the present invention prepared from a suitably selected combination of constituting components-provides a color-forming printed area having much higher sensitivity over the conventional thermosensitive recording materials. As a result, marking with an extended laser beam is possible, and a large volume of information or complicated letters, such as "kanji" (Chinese characters) of moderate sizes can be displayed. Further, a letter pattern of a mask formed by punching may be recorded in a size enlarged at least twice that admitted in conventional laser marking techniques thereby achieving size reduction of the mask and a mask changer for moving the mask. Furthermore, since marking can be effected through one shot without needing division of laser light, the optical system to be used can be simplified (a single optical system will do) thereby making it possible to reduce the cost of the laser marking apparatus and to omit microadjustment control of the laser irradiation distance which has been required in using divided laser light. From another viewpoint, since marking with a pulsing laser can be achieved over an area twice or more times wider than the conventionally recognized area, recording of a larger volume of information can be effected not only at a time but, by using divided laser light, on a plurality of parts.

In addition, since marking can be conducted with a reduced amount of irradiated laser light energy, destruction or evaporation of a printed layer or a substrate which produces dust hardly takes place. As a result, there is no need to install a dust collector, the marking cost is reduced, the space is saved, and durability of an optical system can be improved. Moreover, evaporation of an overcoat layer functioning as a protective layer for a label is suppressed so that the label has improved durability.

The thermosensitive recording material for laser marking according to the present invention is applicable to thermosensitive recording with a conventional thermal head as well as a laser. The marking recorded on the thermosensitive recording material of the present invention with a laser or a thermal head is excellent in water resistance and resistance to plasticizers.

According to the laser marking method of the present invention, a laser color-forming layer of arbitrary pattern can be formed easily, and marking can be obtained non-destructively, speedily, and efficiently because of the high sensitivity of the color-forming layer. Thus, the method of the present invention is especially suited for making over a wide area at a high speed, e.g., 600 to 6,000 markings per minute, on labels, wrapping paper, cards, and so forth.

The present invention will now be illustrated in greater detail with reference to Examples, but the present invention should not be construed as being limited thereto. All the parts and percents are by weight unless otherwise indicated.

EXAMPLES 1 TO 24 AND COMPARATIVE EXAMPLES 1 TO 24

Aluminum-deposited paper was printed with a gravure white ink to prepare a substrate (hereinafter referred to as substrate I).

The components shown in Table 1 below were shaken together with glass beads in a paint conditioner for 3 hours to prepare a one-pack gravure ink. The amount of methanol in the composition was appropriately decided so that the resulting gravure ink might have a viscosity of 30±3 seconds by using Zahn viscometer (orifice size: 3 mm). The resulting printing ink was printed on substrate I by using a heliographic photogravure having an angle of 0° and a line number of 60/cm and dried to form a color-forming layer.

In Examples 5 to 7, 12 to 14, 19 to 21, and 24, the color-forming layer after being dried was further printed with a nitrocellulose-based gravure OP varnish ("SF 815" produced by Dainippon Ink and Chemicals, Inc.) to form an overcoat.

TABLE 1

| Example No. | Color Former (part) | Color Developer (part) | Binder Resin (part) | Additive (part) | pH of Additive | Sensitizer (part) | Methanol (part) | Viscosity (part) | Overcoat |
|---|---|---|---|---|---|---|---|---|---|
| 1 | TG-11[1] (2.0) | catechol (1.0) | M995F[8] (3.0) | a-1[13] (1.5) | 2.4 | Zn-B[28] (2.0) | 3.0 | 30 | none |
| 2 | TG-11[1] (2.0) | catechol (1.0) | M995F[8] (3.0) | a-2[14] (1.5) | 5.8 | Zn-B[28] (2.0) | " | 29 | " |
| 3 | TG-11[1] (2.0) | catechol (1.0) | M995F[8] (3.0) | a-3[15] (1.5) | 3.8 | Zn-B[28] (2.0) | " | 30 | " |
| 4 | TG-11[1] (2.0) | catechol (1.0) | M995F[8] (3.0) | a-4[16] (0.5) | 3.8 | Zn-B[28] (2.0) | " | 32 | " |
| 5 | TH-106[2] (2.0) | B.A[5] (1.0) | F-30[9] (3.0) | b[17] (1.0) | 4.0 | Zn-B[28] (2.0) | 3.2 | 32 | provided |
| 6 | ETAC[3] (2.0) | resorcin (1.0) | FS-350[10] (3.0) | c[18] (1.0) | 4.0 | Zn-B[28] (2.0) | " | 32 | " |
| 7 | BLACK 305[4] (2.0) | pyrogallol (1.0) | A-90[11] (3.0) | d[19] (1.0) | 4.0 | Zn-B[28] (2.0) | " | 31 | " |
| 8 | TG-11 (2.0) | catechol (1.0) | M995F (3.0) | e-1[20] (1.5) | 10.9 | Zn-B[28] (2.0) | 3.0 | 30 | none |
| 9 | TG-11 (2.0) | catechol (1.0) | M995F (3.0) | e-2[21] (1.5) | 13.0 | Zn-B[28] (2.0) | 3.0 | 29 | " |
| 10 | TG-11 (2.0) | catechol (1.0) | M995F (3.0) | e-3[22] (1.5) | 12.3 | Zn-B (2.0) | 3.0 | 29 | none |
| 11 | TG-11 (2.0) | catechol (1.0) | M995F (3.0) | e-4[23] (0.5) | 12.3 | Zn-B (2.0) | 3.4 | 32 | " |
| 12 | TH-106 (2.0) | B.A (1.0) | F-30 (3.0) | f[24] (1.0) | 9.5 | Zn-B (2.0) | 3.2 | 31 | provided |
| 13 | ETAC (2.0) | resorcin (1.0) | FS-350 (3.0) | g[25] (1.0) | 9.5 | Zn-B (2.0) | 3.2 | 31 | " |
| 14 | BLACK 305 (2.0) | pyrogallol (1.0) | A-90 (3.0) | h[26] (1.0) | 9.5 | Zn-B (2.0) | 3.2 | 31 | " |

TABLE 1-continued

| Example No. | Color Former (part) | Color Developer (part) | Binder Resin (part) | Additive (part) | pH of Additive | Sensitizer (part) | Methanol (part) | Viscosity (part) | Overcoat |
|---|---|---|---|---|---|---|---|---|---|
| 15 | TG-11 (2.0) | catechol (1.0) | FS-350 (3.0) | glycine aq.[27] (1.0) | — | Zn-B (2.0) | 3.2 | 30 | none |
| 16 | TG-11 (2.0) | catechol (1.0) | FS-350 (3.0) | alanine aq. (1.0) | — | Zn-B (2.0) | 3.2 | 31 | " |
| 17 | TG-11 (2.0) | catechol (1.0) | FS-350 (3.0) | serine aq. (1.0) | — | Zn-B (2.0) | 3.2 | 31 | " |
| 18 | TG-11 (2.0) | catechol (1.0) | FS-350 (3.0) | N-methyl-glycine aq. (1.0) | — | Zn-B (2.0) | 3.2 | 31 | none |
| 19 | TH-106 (2.0) | catechol (1.0) | A-90 (3.0) | ion-exchanged water (1.5) | — | Zn-B (2.0) | 3.4 | 32 | provided |
| 20 | TH-106 (2.0) | catechol (1.0) | A-90 (3.0) | ion-exchanged water (0.5) | — | Zn-B (2.0) | 3.4 | 33 | " |
| 21 | TH-106 (2.0) | catechol (1.0) | A-90 (3.0) | well water (1.5) | — | Zn-B (2.0) | 3.4 | 32 | " |
| 22 | TH-106 (2.0) | GA-Pr[6] (1.0) | K-80[12] (3.0) | ammonium chloride aq. (1.5) | — | Zn-B (2.0) | 3.6 | 29 | none |
| 23 | TH-106 (2.0) | GA-Pr[6] (1.0) | K-80[12] (3.0) | ammonium nitrate aq. (1.5) | — | Zn-B (2.0) | 3.6 | 29 | " |
| 24 | TG-11 (2.0) | GA-St[7] (1.0) | K-80[12] (3.0) | ammonium chloride aq. (1.5) | — | Zn-B (2.0) | 3.6 | 33 | provided |

Note:
[1] A trade name of 2-(2-fluorophenylamino)-6-diethylaminofluoran produced by Nippon Kayaku Co., Ltd.
[2] A trade name of 2-(2-chlorophenylamino)-6-diethylaminofluoran produced by Hodogaya Chemical Co., Ltd.
[3] A trade name of 2-N-phenyl-3-methyl-6-ethylaminofluoran produced by Yamada Chemical Co., Ltd.
[4] A trade name of 2-N-phenyl-3-methyl-6,6-bisdipentylaminofluoran produced by Yamada Chemical Co., Ltd.
[5] Bisphenol A
[6] n-Propyl gallate
[7] Stearyl gallate
[8] A trade name of a polyamide resin produced by Nihon Rilsan Co., Ltd.
[9] A trade name of a polyamide resin produced by Teikoku Chemical Industry Co., Ltd.
[10] A trade name of a polyamide resin produced by Teikoku Chemical Industry Co., Ltd.
[11] A trade name of a polyamide resin produced by Toray Industries, Inc.
[12] A trade name of a polyamide resin produced by Toray Industries, Inc.
[13], 15) and 16) A Sørensen's buffer solution (0.1M glycine + 0.1M sodium chloride + 0.1N hydrochloric acid)
[14] A Sorensen's buffer solution (0.1M sodium citrate + 0.1N sodium hydroxide)
[17] A Clark-Lubs' buffer solution (0.2M potassium hydrogenphthalate + 0.2N sodium hydroxide)
[18] A Kolthoft's buffer solution (0.1M potassium hydrogen citrate + 0.1N sodium hydroxide)
[19] A Michaelis' buffer solution (0.1N tartaric acid + 0.1M sodium tartrate)
20), 21), 22) and 23) A Sørensen's buffer solution (0.1M glycine + 0.1M sodium chloride + 0.1N sodium hydroxide)
[24] A Kolthoft's buffer solution (0.05M borax + 0.05M sodium carbonate)
[25] A Michaelis's buffer solution (0.1M ammonium chloride + 0.1N aqueous ammonia)
[26] A Menzel's buffer solution (0.05M sodium carbonate + 0.1 N sodium hydrogencarbonate)
[27] "aq." means an aqueous solution.
[28] Zinc borate Laser light having an irradiation energy quantity of 0.35 J/cm$^2$•pulse emitted from a TEA type carbonic acid gas laser was irradiated on the color-forming layer either directly or via the overcoat (OP varnish layer) through a metal mask having a punched letter pattern.

The amount of the laser energy was measured by irradiating one pulse of the carbonic acid gas laser light on a detector ("ED-500" manufactured by Gentec Co.) placed at the position of the metal mask, reading the output voltage from the detector with an oscilloscope, calculating the total irradiation energy quantity according to the conversion formula of the detector, and dividing the resulting total irradiation energy quantity by the irradiated area to be marked to obtain an irradiation energy quantity per unit area•pulse.

For comparison, a one-pack gravure ink was prepared in the same manner as in Examples 1 to 24, except for compounding no additive as a background color formation inhibitor, and the resulting ink was printed and irradiated with laser light in the same manner as in Example 1 to 24 to obtain marking.

Each of the resulting inks and thermosensitive recording materials before and after laser marking was evaluated with respect to the following items and rated according to the standards shown. The results obtained are shown in Table 2.

1) Printability of Ink

Surface smoothness of the printed color-forming layer was observed with the naked eye and rated "excellent", "good", "slightly poor" or "poor".

2) Anti-Background Color Formation

The degree of freedom from black color development on the printed color-forming layer before laser irradiation was observed with the naked eye and rated "excellent", "good", "slightly poor (slight black color development)" or "poor (considerable black color development)".

3) Laser Color Developability

The color developability of the laser-irradiated area and the clearness of the resulting color image were evaluated and inclusively rated "excellent", "good", "slightly poor" or "poor".

TABLE 2

| Example No. | Printability | Anti-Background Color Formation | Laser Color Developability | Compar. Example No. | Printability | Anti-Background Color Formation | Laser Color Developability |
|---|---|---|---|---|---|---|---|
| 1 | excellent | excellent | excellent | 1 | excellent | slightly poor to poor | good |
| 2 | " | " | " | 2 | " | slightly poor to poor | " |
| 3 | " | " | " | 3 | " | slightly poor to poor | " |
| 4 | " | " | " | 4 | " | slightly poor to poor | " |
| 5 | " | " | " | 5 | " | slightly poor to poor | " |
| 6 | " | " | " | 6 | " | slightly poor | " |
| 7 | " | " | " | 7 | " | slightly poor | " |
| 8 | " | " | " | 8 | " | slightly poor | " |
| 9 | " | " | " | 9 | " | slightly poor to poor | " |
| 10 | " | " | " | 10 | " | slightly poor to poor | " |
| 11 | " | " | " | 11 | " | slightly poor to poor | " |
| 12 | " | " | " | 12 | " | slightly poor to poor | " |
| 13 | excellent | excellent | excellent | 13 | excellent | slightly poor | good |
| 14 | " | " | " | 14 | " | slightly poor | " |
| 15 | " | " | " | 15 | " | poor | " |
| 16 | " | good to excellent | " | 16 | " | poor | " |
| 17 | " | good to excellent | " | 17 | " | poor | " |
| 18 | " | good to excellent | " | 18 | " | poor | " |
| 19 | " | good | " | 19 | " | slightly poor to poor | " |
| 20 | " | " | " | 20 | " | slightly poor to poor | " |
| 21 | " | " | " | 21 | " | slightly poor to poor | " |
| 22 | " | excellent | " | 22 | " | poor | " |
| 23 | " | " | " | 23 | " | " | " |
| 24 | " | " | " | 24 | " | " | " |

As is apparent from the results in Table 2, it is seen that addition of the background color formation inhibitor according to the present invention suppresses background color formation and markedly improves laser color developability.

| Fluoran type leuco dye (TH-106) | 2.0 parts |
|---|---|
| Propyl gallate | 1.0 part |
| AQ nylon "K-80" (20% ethanol solution) | 3.0 parts |
| Fluorine-substituted tetrasilicon mica | 1.5 parts |
| Ethanol | 6.5 parts |
| Ammonium chloride aqueous solution | 1.0 part |

The above components were mixed and dispersed in a bead mill to prepare a one-pack printing ink. After the viscosity was adjusted in the same manner as in Example 1, the ink was printed on substrate I to obtain a thermosensitive recording material in the same manner as in Example 1. Laser marking on the thermosensitive recording material was effected in the same manner as in Example 1.

The printing ink suffered from no color formation either before printing or after printing (background color formation) and provided a satisfactory image.

COMPARATIVE EXAMPLE 25

A one-pack printing ink was prepared in the same manner as in Example 25, except that the ammonium chloride aqueous solution was not used. The resulting ink assumed a color and was of no practical use.

EXAMPLE 26

A one-pack printing ink was prepared from the following components in the same manner as in Example 25.

| | |
|---|---|
| Fluoran type leuco dye (TH-106) | 2.0 parts |
| Propyl gallate | 1.0 part |
| Polyamide resin "Tomide #92" (produced by Fuji Kasei Kogyo Co., Ltd.) (40% isopropyl alcohol solution) | 1.5 parts |
| Zinc borate | 1.5 parts |
| Isopropyl alcohol | 5.0 parts |
| Glycine aqueous solution | 1.0 part |
| Surface active agent "Homogenol L-18" (produced by Kao Co., Ltd.) | 0.02 part |

A thermosensitive recording material was prepared using the resulting ink, and laser marking was carried out in the same manner as in Example 25. No background color formation occurred, and a clear and satisfactory image was obtained.

While the invention has been described in detail and with reference to specific examples thereof, it will be apparent to one skilled in the art that various changes and modifications can be made therein without departing from the spirit and scope thereof.

What is claimed is:

1. A laser marking method comprising irradiating laser light on a thermosensitive color-forming layer formed on a substrate, said thermosensitive color-forming layer being formed by printing with a printing ink comprising a leuco dye as a color former and an acidic substance as a color developer, wherein said printing ink further comprises at least one background color formation inhibitor selected from the group consisting of a water-soluble amino acid, an ammonium salt of an inorganic acid, a pH buffer, and water,
   wherein said water-soluble amino acid is present in an amount of 2 to 30% by weight based on the total weight of the printing ink;
   wherein said inorganic acid ammonium salt is present in an amount of 0.1 to 20% by. weight based on the total weight of the printing ink;
   wherein said pH buffer is present in an amount of 2 to 30% by weight based on the total weight of the printing ink; and
   wherein said water is present in an amount of 2 to 35% by weight based on the total weight of the printing ink.

2. A laser marking method as claimed in claim 1, wherein said background color formation inhibitor is a water-soluble amino acid.

3. A laser marking method as claimed in claim 1, wherein said background color formation inhibitor is an ammonium salt of an inorganic acid.

4. A laser marking method as claimed in claim 1, wherein said background color formation inhibitor is a pH buffer.

5. A laser marking method as claimed in claim 1, wherein said printing ink further comprises a sensitizer for laser marking.

6. A laser marking method as claimed in claim 1, wherein said printing ink further comprises a neutral resin soluble in a lower alcohol or a mixture of a lower alcohol and water and capable of film formation as a binder resin and a lower alcohol or a mixture of a lower alcohol and water as a solvent.

7. A laser marking method as claimed in claim 5, wherein said sensitizer is at least one insoluble compound selected from the group consisting of a boric acid salt, a phosphoric acid salt, and a silicic acid salt.

8. A laser marking method as claimed in claim 5, wherein said sensitizer is a boric acid salt.

9. A laser marking method as claimed in claim 5, wherein said sensitizer is zinc borate.

10. A laser marking method as claimed in claim 1, wherein said acidic substance is a phenolic compound.

11. A laser marking method as claimed in claim 10, wherein said phenolic compound is a polyfunctional phenolic compound having two or more phenolic hydroxyl groups and having a phenolic hydroxyl equivalent of not more than 400.

12. A laser marking method as claimed in claim 11, wherein said polyfunctional phenolic compound is an alkyl gallate.

13. A printing ink for laser marking comprising a leuco dye as a color former and an acidic substance as a color developer, wherein said printing ink further comprises at least one background color formation inhibitor selected from the group consisting of a water-soluble amino acid, an ammonium salt of an inorganic acid, a pH buffer, and water,
   wherein said water-soluble amino acid is present in an amount of 2 to 30% by weight based on the total weight of the printing ink;
   wherein said inorganic acid ammonium salt is present in an amount of 0.1 to 20% by weight based on the total weight of the printing ink;
   wherein said pH buffer is present in an amount of 2 to 30% by weight based on the total weight of the printing ink;
   wherein said water is present in an amount of 2 to 35% by weight based on the total weight of the printing ink; and
   wherein said printing ink further comprises a sensitizer for laser marking, said sensitizer being at least one insoluble compound selected from the group consisting of a boric acid salt, a phosphoric acid salt and a silicic acid salt.

14. A printing ink for laser marking as claimed in claim 13, wherein said background color formation inhibitor is a water-soluble amino acid.

15. A printing ink for laser marking as claimed in claim 13, wherein said background color formation inhibitor is an ammonium salt of an inorganic acid.

16. A printing ink for laser marking as claimed in claim 13, wherein said background color formation inhibitor is a pH buffer.

17. A printing ink for laser marking as claimed in claim 13, wherein said printing ink further comprises a neutral resin soluble in a lower alcohol or a mixture of a lower alcohol and water and capable of film formation as a binder resin and a lower alcohol or a mixture of a lower alcohol and water as a solvent.

18. A printing ink for laser marking as claimed in claim 13, wherein said sensitizer is a boric acid salt.

19. A printing ink for laser marking as claimed in claim 13, wherein said sensitizer is zinc borate.

20. A printing ink for laser marking as claimed in claim 13, wherein said acidic substance is a phenolic compound.

21. A printing ink for laser marking as claimed in claim 20, said phenolic compound is an alkyl gallate.

22. A printing ink for laser marking as claimed in claim 13, wherein said ink is a gravure ink.

23. A printing ink for laser marking as claimed in claim 13, wherein said ink is a one-pack ink.

* * * * *